US012592150B2

(12) United States Patent
Lee et al.

(10) Patent No.: US 12,592,150 B2
(45) Date of Patent: Mar. 31, 2026

(54) METHOD FOR WARNING COLLISION OF VEHICLE, SYSTEM, VEHICLE, AND COMPUTER READABLE STORAGE MEDIUM

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 543 days.

(21) Appl. No.: 18/121,572

(22) Filed: Mar. 14, 2023

(65) Prior Publication Data

US 2023/0410661 A1    Dec. 21, 2023

(30) Foreign Application Priority Data

Jun. 15, 2022    (CN) .......................... 202210677206.2

(51) Int. Cl.
| | |
|---|---|
| *G08G 1/16* | (2006.01) |
| *G06T 7/194* | (2017.01) |
| *G06T 7/215* | (2017.01) |
| *G06T 7/246* | (2017.01) |
| *G06V 20/56* | (2022.01) |
| *G06V 20/58* | (2022.01) |
| *G08G 1/056* | (2006.01) |

(52) U.S. Cl.
CPC ............. *G08G 1/167* (2013.01); *G06T 7/194* (2017.01); *G06T 7/215* (2017.01); *G06T 7/246* (2017.01); *G06V 20/58* (2022.01); *G06V 20/588* (2022.01); *G08G 1/056* (2013.01);

*G06T 2207/30256* (2013.01); *G06T 2207/30261* (2013.01); *G06V 2201/08* (2022.01)

(58) Field of Classification Search
USPC .................................................. 382/103, 104
See application file for complete search history.

(56) References Cited

U.S. PATENT DOCUMENTS

| | | | | | |
|---|---|---|---|---|---|
| 6,246,961 | B1 * | 6/2001 | Sasaki | ................. | B60W 30/095 701/28 |
| 9,834,139 | B1 * | 12/2017 | Park | ........................ | B60K 35/21 |
| 2006/0178830 | A1 * | 8/2006 | Sherony | .................. | G01S 11/12 340/436 |
| 2016/0129835 | A1 * | 5/2016 | Kim | ........................ | G06V 20/58 701/36 |

FOREIGN PATENT DOCUMENTS

| | | |
|---|---|---|
| CN | 112365741 A | 2/2021 |
| CN | 114530058 A | 5/2022 |

* cited by examiner

*Primary Examiner* — Ishrat I Sherali
(74) *Attorney, Agent, or Firm* — ScienBiziP, P.C.

(57) ABSTRACT

A method for warning collision of vehicle is provided. The method obtains a pre-detected video. The pre-detected video includes a number of video frames, and the video frames are continuous. The method detects one or more vehicles in each of the video frames and determines a movement state of each of the vehicles via an optical flow method. The method detects one or more lane lines in each of the video frames to determine lane information, and determines whether to provide a collision warning according to the lane information and the movement state of each of the vehicles. A related vehicle and a non-transitory storage medium are provided.

17 Claims, 8 Drawing Sheets

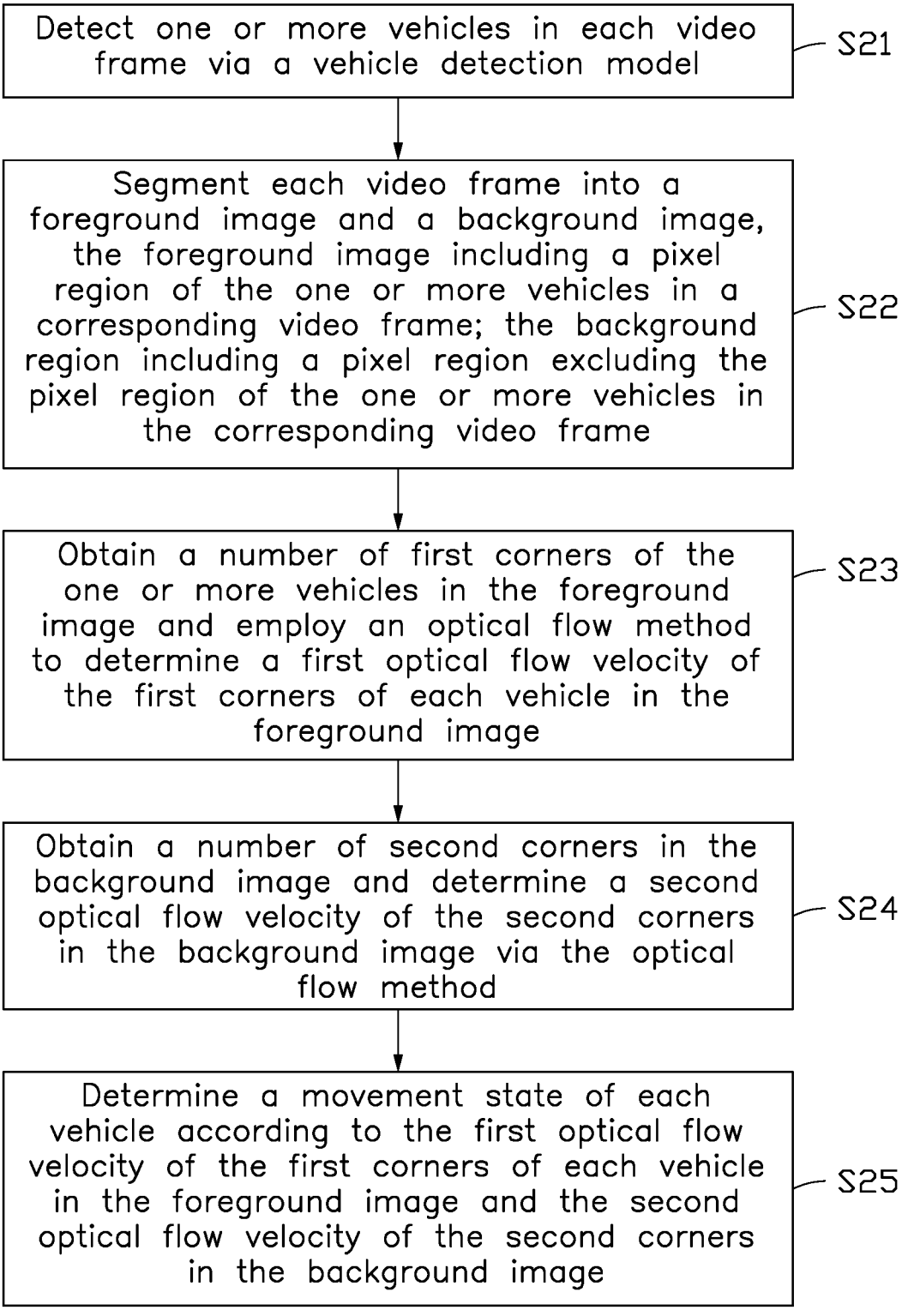

Detect one or more vehicles in each video frame via a vehicle detection model ⟋ S21

Segment each video frame into a foreground image and a background image, the foreground image including a pixel region of the one or more vehicles in a corresponding video frame; the background region including a pixel region excluding the pixel region of the one or more vehicles in the corresponding video frame ⟋ S22

Obtain a number of first corners of the one or more vehicles in the foreground image and employ an optical flow method to determine a first optical flow velocity of the first corners of each vehicle in the foreground image ⟋ S23

Obtain a number of second corners in the background image and determine a second optical flow velocity of the second corners in the background image via the optical flow method ⟋ S24

Determine a movement state of each vehicle according to the first optical flow velocity of the first corners of each vehicle in the foreground image and the second optical flow velocity of the second corners in the background image ⟋ S25

FIG. 2

METHOD FOR WARNING COLLISION OF VEHICLE, SYSTEM, VEHICLE, AND COMPUTER READABLE STORAGE MEDIUM

FIELD

The subject matter herein generally relates to an assistance driving of a vehicle and a self-driving of the vehicle technology, and particularly to a method for warning collision of vehicle, a system, a vehicle, and a computer readable storage medium.

BACKGROUND

For a development of an intelligent driving technology, an application of an intelligent driving system is wider, and application scenarios are more complex. When an instant vehicle is intelligently driven, it is necessary to determine whether a risk of a collision with other vehicles is existed. However, in that way, more sensors are needed, thus a cost is high, and information needed to be processed is more, a false determining and a missed determining can be accordingly easily generated. Thus, it is urgent to propose a method for warning collision of a vehicle which has lower cost and is more accuracy.

SUMMARY

An embodiment of the present application provides a method for warning collision of vehicle, a system, a vehicle, and a computer readable storage medium which are capable of achieving a collision warning for the vehicle at a lower cost and lowing a false determining and a missed determining.

In a first aspect, an embodiment of the present application provides a method for warning collision of vehicle. The method includes obtaining a pre-detected video. The pre-detected video includes a number of video frames, and the video frames are continuous. The method includes detecting one or more vehicles in each video frame and determining a movement state of each vehicle via an optical flow method. The method includes detecting one or more lane lines in each video frame to determine lane information, and determining whether to provide a collision warning according to the lane information and the movement state of each vehicle.

According to some embodiments of the present application, the lane information includes whether the vehicle and the instant vehicle are at the same lane. The movement state of the vehicle includes a movement direction of the vehicle. Before determining whether to provide the collision warning according to the lane information and the movement state of each vehicle, the method further includes obtaining a movement direction of the instant vehicle. The determining whether to provide the collision warning according to the lane information and the movement state of each vehicle includes, providing the collision warning if the vehicle is moving, the vehicle and the instant vehicle are at the same lane, and the movement direction of the vehicle is opposite to the movement direction of the instant vehicle.

According to some embodiments of the present application, the lane information includes a first lane that an instant vehicle is at and a second lane that the vehicle is at. The movement state of the vehicle includes a movement direction of the vehicle. Before determining whether to provide the collision warning according to the lane information and the movement state of each vehicle, the method further includes obtaining a movement direction of the instant vehicle. The determining whether to provide the collision warning according to the lane information and the movement state of each vehicle includes, providing the collision warning if the vehicle is moving, the vehicle and the instant vehicle are at different lanes, the movement direction of the instant vehicle is going straight along the second lane, and the movement direction of the vehicle intersects with the second lane.

According to some embodiments of the present application, the lane information includes a first lane that an instant vehicle is at, a second lane that the vehicle is at, and whether the vehicle and the instant vehicle are at two lanes in the same direction. The movement state of the vehicle includes a movement direction of the vehicle. Before determining whether to provide the collision warning according to the lane information and the movement state of each vehicle, the method further includes obtaining a movement direction of the instant vehicle. The determining whether to provide the collision warning according to the lane information and the movement state of each vehicle includes, providing the collision warning if the vehicle is moving, the vehicle and the instant vehicle are at two lanes in an opposite direction, the movement direction of the instant vehicle is going straight along the second lane, and the movement direction of the vehicle is going a left-turn U-turn from the first lane to the second lane.

According to some embodiments of the present application, the lane information includes a first lane that an instant vehicle is at and a second lane that the vehicle is at. The movement state of the vehicle includes a movement direction of the vehicle. Before determining whether to provide the collision warning according to the lane information and the movement state of each vehicle, the method further includes obtaining a movement direction of the instant vehicle. The determining whether to provide the collision warning according to the lane information and the movement state of each vehicle includes, not provide the collision warning if the vehicle is moving, the vehicle and the instant vehicle are at different lanes, and the movement direction of the vehicle does not intersect with the movement direction of the instant vehicle.

According to some embodiments of the present application, the lane information further includes a first lane that an instant vehicle is at, a second lane that the vehicle is at, and whether the vehicle and the instant vehicle are at two lanes in the same direction. The movement state of the vehicle includes a movement direction of the vehicle. Before determining whether to provide the collision warning according to the lane information and the movement state of each vehicle, the method further includes obtaining a movement direction of the instant vehicle. The determining whether to provide the collision warning according to the lane information and the movement state of each vehicle includes, not providing the collision warning if the vehicle is moving, the vehicle and the instant vehicle are at two lanes in an opposite direction, the movement direction of the instant vehicle is turning right from the first lane to a right lane of the first lane, and the movement direction of the vehicle is turning right from the second lane to a right lane of the second lane.

According to some embodiments of the present application, the method segments each video frame into a foreground image and a background image. The foreground image includes a pixel region of the one or more vehicles in a corresponding video frame. The background region includes a pixel region excluding the pixel region of the one or more vehicles in the corresponding video frame. The method further obtains a number of first corners of the one or more vehicles in the foreground image and employs an optical flow method to determine a first optical flow velocity of the first corners of each vehicle in the foreground image. The method further obtains a number of second corners in the background image and employs an optical flow method to determine a second optical flow velocity of the second corners in the background image. The method further determines a movement state of each vehicle according to the first optical flow velocity of the first corners of each vehicle in the foreground image and the second optical flow velocity of the second corners in the background image.

According to some embodiments of the present application, the method determines that the vehicle is still if a different value between the first optical flow velocity of the first corners of each vehicle in the foreground image and the second optical flow velocity of the second corners in the background image is within a preset range. The method further determines that the vehicle is moving and determines a movement direction of the vehicle if the different value between the first optical flow velocity of the first corners of each vehicle in the foreground image and the second optical flow velocity of the second corners in the background image is outside the preset range.

In a second aspect, an embodiment of the present application provides a system for warning collision of vehicle. The system includes an image generating module, a first detection module, a second detection module, and a warning module. The image generating module obtains a pre-detected video. The pre-detected video includes a number of video frames, and the video frames are continuous. The first detection module detects one or more vehicles in each video frame and determines a movement state of each vehicle via an optical flow method. The second detection module detects one or more lane lines in each video frame to determine lane information. The warning module determines whether to provide a collision warning according to the lane information and the movement state of each vehicle.

In a third aspect, an embodiment of the present application provides a vehicle. The vehicle includes a storage device, and at least one processor. The storage device stores one or more programs, which when executed by the at least one processor, cause the at least one processor to obtain a pre-detected video. The pre-detected video includes a number of video frames, and the video frames are continuous. The at least one processor detects one or more vehicles in each video frame and determines a movement state of each vehicle via an optical flow method. The at least one processor detects one or more lane lines in each video frame to determine lane information, and determines whether to provide a collision warning according to the lane information and the movement state of each vehicle.

In a fourth aspect, an embodiment of the present application also provides a non-transitory storage unit. The non-transitory storage medium stores a set of commands, when the commands being executed by at least one processor of a vehicle, causing the at least one processor to obtain a pre-detected video. The pre-detected video includes a number of video frames, and the video frames are continuous. The at least one processor detects one or more vehicles in each video frame and determines a movement state of each vehicle via an optical flow method. The at least one processor detects one or more lane lines in each video frame to determine lane information, and determines whether to provide a collision warning according to the lane information and the movement state of each vehicle.

The disclosure can combine a detection of the one or more vehicles and a detection of the lane line, to determine the lane information, and to determine the movement state of the vehicle via the optical flow method, and the lane information and the movement state of the one or more vehicle can be combined to determine whether the collision risk is existed. Thereof, the collision warning can be achieved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 2 is a flowchart of an embodiment describing a process for detecting one or more vehicles in each video frame and determining a movement state of each vehicle via an optical flow method.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

For a development of an intelligent driving technology, an application of an intelligent driving system is wider, and application scenarios are more complex. When an instant vehicle is intelligently driven, it is necessary to determine whether a risk of a collision with other vehicles is existed. However, in that way, more sensors are needed, thus a cost is high, information needed to be processed is more, and a computing workload is larger, a false determining and a missed determining can be accordingly easily generated.

Figure 1:
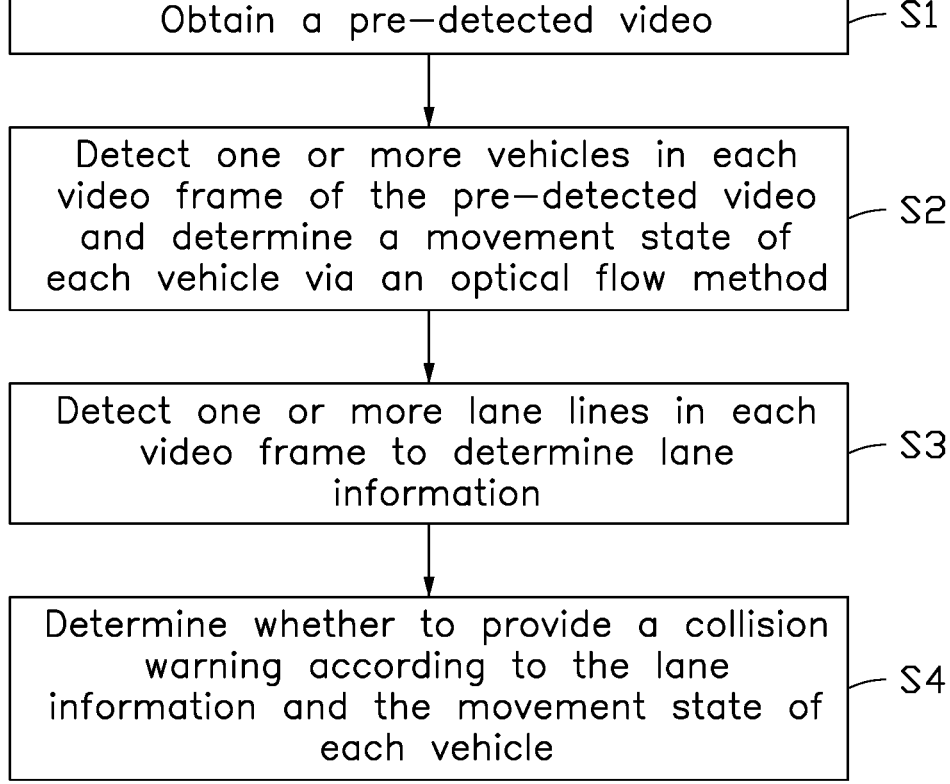
FIG. 1 is a flowchart of an embodiment of a method for warning collision of vehicle.

Referring to FIG. 1, a method for warning collision of vehicle is shown. The method can achieving a collision warning for the vehicle at a lower cost and lowing the false determining and the missed determining.

FIG. 1 is a flowchart of an embodiment of the method. According to different requirements, the order of the steps in the flowchart can be changed, and fewer steps can be utilized with departing from this disclosure.

It can be understood that, the method of the embodiment can be applied on various moving device to provide a collision warning for the moving vehicle. For the convenience of description, the instant vehicle can be used as an example to illustrate the moving device in the following description. The method can provide the collision warning for the vehicle according to a detected movement state of the vehicle in a vehicle coordinate system of the instant vehicle.

In the embodiment, the method includes:

Step S1, obtaining a pre-detected video.

In some embodiments, a camera is installed on the instant vehicle to capture an environment around the instant vehicle, to generate the pre-detected video. Each video frame in the pre-detected video can include one or more lane lines, one or more vehicles around the instant vehicle, and one or more buildings or one or more barrier structures. The video frames are continuous. The barrier structure can be, for example trees, flower nurseries, and so on.

In some embodiments, the camera is installed on an anterior half of the vehicle, for example a position such as a front region, a rear view mirror, or the like. The camera can be configured to obtain a video of a road on a forward motion direction of the instant vehicle.

It can be understood that, the camera can be installed on the other position, for example, a top region of the vehicle, or the like, the disclosure is not limited herein.

Step S2, detecting one or more vehicles in each video frame and determining a movement state of each vehicle via an optical flow method.

In detail, referring to FIG. 2, in some embodiments, the step S2 includes:

S21: detecting one or more vehicles in each video frame via a vehicle detection model.

In some embodiments, the vehicle detection model can detect one or more vehicles in each video frame via an extraction feature method, for example, an edge feature extraction method, or the like.

S22: segmenting each video frame into a foreground image and a background image, the foreground image including a pixel region of the one or more vehicles in a corresponding video frame; the background region including a pixel region excluding the pixel region of the one or more vehicles in the corresponding video frame.

In some embodiments, the step S22 includes a step a1 and a step a2. The step a1 includes generating a first image mask and a second image mask according to the pixel region of the detected one or more vehicles in the corresponding video frame.

The step a2 includes multiplying the first image mask and the corresponding video frame to generate the foreground image, and multiplying the second image mask and the corresponding video frame to generate the background image.

In some embodiments, the pixel value of each pixel point in the pixel region of the detected one or more vehicles in the corresponding video frame is given to 1, and the pixel value of each pixel point in the other pixel region in the corresponding video frame is given to 0, to generate the first image mask. The pixel value of each pixel point in the pixel region of the detected one or more vehicles in the corresponding video frame is given to 0, and the pixel value of each pixel point in the other pixel region in the corresponding video frame is given to 1, to generate the second image mask.

Step S23: obtaining a number of first corners of the one or more vehicles in the foreground image and employing an optical flow method to determine a first optical flow velocity of the first corners of each vehicle in the foreground image.

In some embodiments, a Susan corner extraction method or a Harris corner extraction method can be employed to extract the first corners of the vehicle in the foreground image. For example, in some embodiments, a Harris corner extraction method based on an autocorrelation matrix and an differential operator to obtain changes of gray level values of the pixel points in the foreground images, to extract the first corners of the vehicle in the foreground image.

In some embodiments, the method determines a velocity vector of the first corners of the vehicle in the foreground image via an optical flow constraint equation to determine the first optical flow velocity of the first corners of the vehicle in the foreground image via the optical flow method. Where, a displacement vector formed by the first corners of the vehicle between the adjacent foreground images, represents a movement of the first corners of the vehicle between the adjacent foreground images. Thus, via calculating a displacement vector of the first corners of the vehicle between continuous images, the first optical flow velocity of the first corners of the vehicle in the foreground image can be determined, namely, the velocity vector of the vehicle is the first optical flow velocity of the vehicle.

It can be understood that, there may be some vehicles in the foreground image, thus, when there are some vehicles in the foreground image, the method can obtain the first corners of each vehicle in the foreground image and determine the first optical flow velocity of each vehicle in the foreground image via the first corners of a corresponding vehicle.

Step S24, obtaining a number of second corners in the background image and determining a second optical flow velocity of the second corners in the background image via the optical flow method.

The process of obtaining a number of second corners in the background image and determining the second optical flow velocity of the second corner in the background image via the optical flow method in the step S24 is similar to, the process of obtaining a number of first corners of the one or more vehicles in the foreground image and employing the optical flow method to determine the first optical flow velocity of the first corners of each vehicle in the foreground image in the step S23, and is not described herein.

Step S25: determining a movement state of each vehicle according to the first optical flow velocity of the first corners of each vehicle in the foreground image and the second optical flow velocity of the second corners in the background image.

In some embodiments, when a different value between the first optical flow velocity of the first corners of each vehicle in the foreground image and the second optical flow velocity of the second corners in the background image is within a preset range, the first optical flow velocity can be determined to be almost the same with the second optical flow velocity, namely, a corresponding vehicle can be determined to be still.

When a different value between the first optical flow velocity of the first corners of each vehicle in the foreground image and the second optical flow velocity of the second corners in the background image is outside the preset range, the corresponding vehicle can be determined to be moving, and a direction of the first optical flow velocity can be determined to be a movement direction of the corresponding vehicle.

Step S3: detecting one or more lane lines in each video frame to determine lane information.

Figure 3:
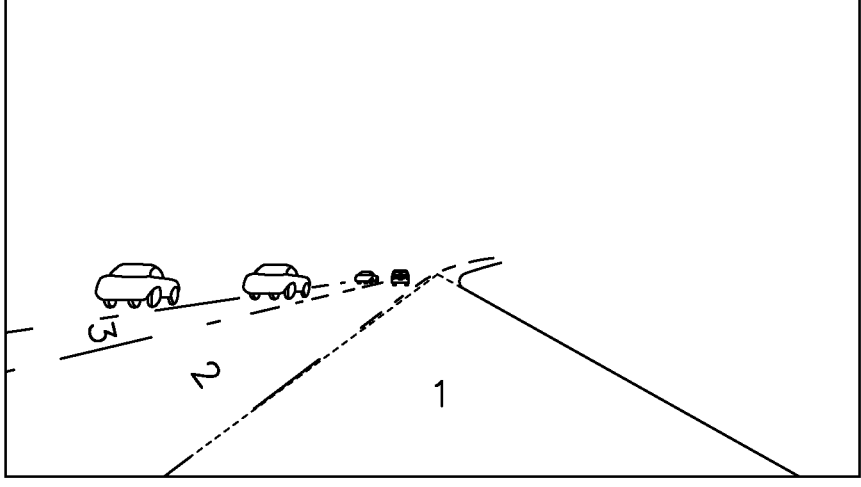
FIG. 3 is a schematic view of an embodiment of a video frame obtained by an instant vehicle.

In some embodiments, the one or more lane lines in each video frame can be detected and obtained via a lane detection model, thus a lane that the instant vehicle is at and lanes that the one or more vehicles are at can be determined. For example, referring to FIG. 3, in some embodiments, the lane detection model can be used to identify the one or more lane lines and divide into a lane 1, a lane 2, and a lane 3 via the edge feature extraction method or an image segmenting method. Then the instant vehicle can be determined to be at the lane 1, and a vehicle A can be determined to be at the lane 3 according to the detected vehicle A in each video frame. In the other embodiments, the land detection model can be a trained neural network model. The lane detection model can be used to identify the one or more lane lines and divide into the different lanes based on each video frame.

It can be understood that, the lane information can be whether the one or more vehicles and the instant vehicle are at the same lane, the disclosure is not limited herein. For example, the lane information can be that the vehicle A and the instant vehicle are at the same lane, and a vehicle B and the instant vehicle are at different lanes. Or, for example, the lane information can be that the vehicle A and the instant vehicle are at different lanes, and the vehicle B and the instant vehicle are at the same lane.

It can be understood that, in some embodiments, the method can firstly execute a process of detecting one or more lane lines in each video frame in the step S3, secondly execute a process of detecting the one or more vehicles in each video frame, and thirdly determine the lane information according to the lane lines and the one or more vehicles. In the other embodiments, the method can execute the process of detecting one or more lane lines in each video frame in the step S3 and the process of detecting the one or more vehicles in each video frame simultaneously, and then determine the lane information according to the lane lines and the one or more vehicles.

Step S4: determining whether to provide a collision warning according to the lane information and the movement state of each vehicle.

It can be understood that, in the foreground image, there may be one or some vehicles. For the convenience of description, one vehicle being in the foreground image can be used as an example to illustrate the following method.

In some embodiments, before the step S4, the method further obtains a movement direction of the instant vehicle. The movement direction of the instant vehicle can be generated via sensors on the instant vehicle. The sensors can be a camera, a gyroscope, and so on.

Figure 4:
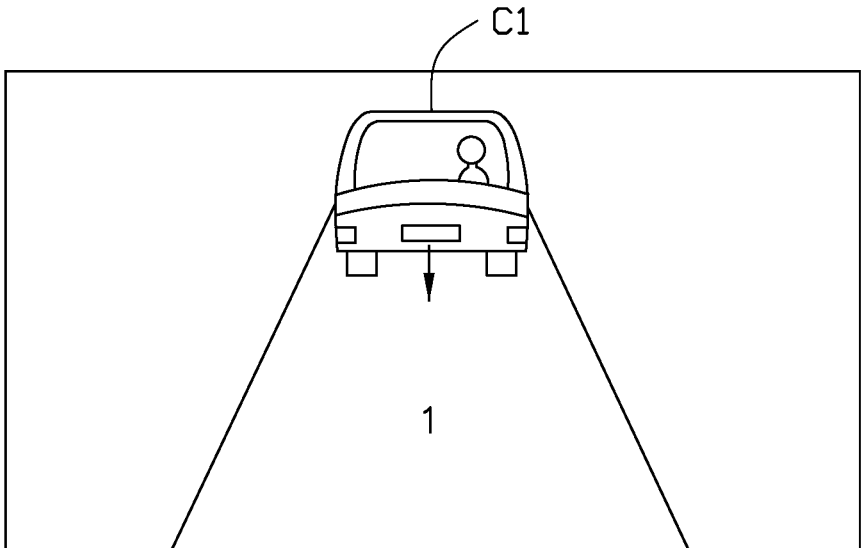
FIG. 4 is a schematic view of an embodiment of a vehicle at a road captured by the instant vehicle at a first traffic scenario.

Referring to FIG. 4, in a first scenario, a vehicle C1 is moving, and the vehicle C1 and the instant vehicle are at the same lane, for example at the lane 1. If the movement direction of the vehicle C1 is opposite to the movement direction of the instant vehicle, the method can provide the collision warning.

Figure 5:
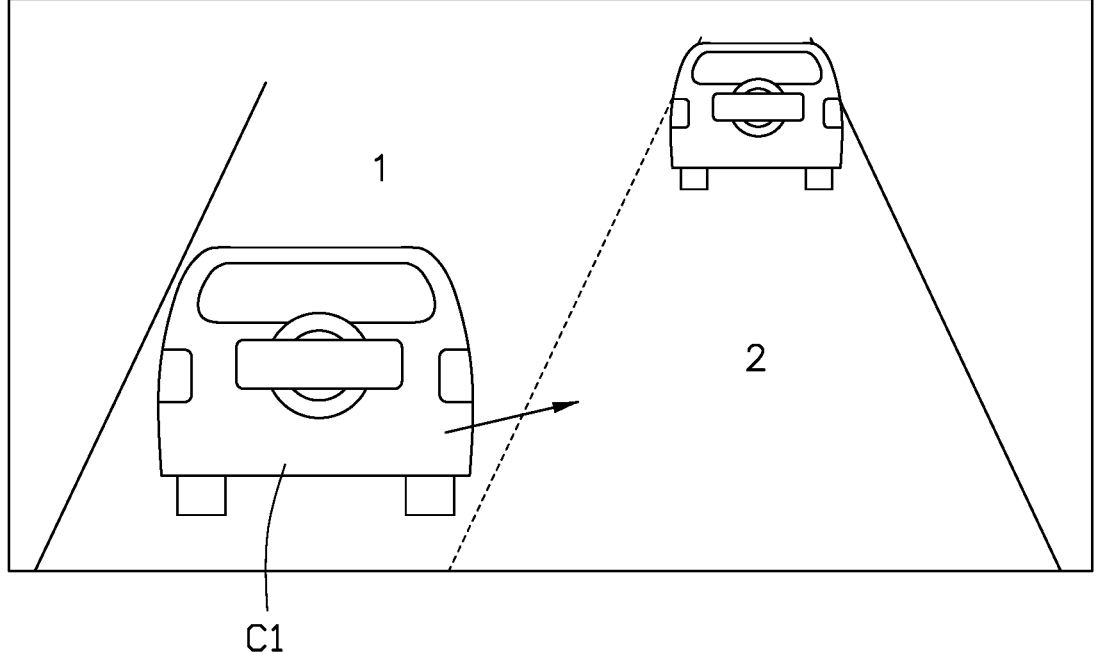
FIG. 5 is a schematic view of an embodiment of a vehicle at a road captured by the instant vehicle at a second traffic scenario.

Referring to FIG. 5, in a second scenario, the vehicle C1 is moving, and the vehicle C1 and the instant vehicle are at the different lanes. The vehicle C1 is at a first lane, for example the lane 1. The instant vehicle is at a second lane, for example the lane 2. If the movement direction of the vehicle C1 deviates from the first lane and the movement direction of the vehicle C1 intersects with the second lane, the method can provide the collision warning.

It can be understood that, in the second scenario, the lane information can further include whether the vehicle C1 and the instant vehicle are at two lanes in the same direction. And, in the second scenario, the vehicle C1 and the instant vehicle are not limited to be at two lanes in the same direction as shown in the FIG. 5, the vehicle C1 and the instant vehicle can be at two lanes in an opposite direction. When the vehicle C1 and the instant vehicle are at two lanes in an opposite direction, the method provides the collision warning if the movement direction of the vehicle C1 intersects with the second lane can be, for example, at the traffic lights facing the junctions, the instant vehicle goes straight along the second lane, and the vehicle C1 goes a left-turn U-turn from the first lane to the second lane. Thus, the movement direction of the vehicle C1 intersects with the second lane, the method provides the collision warning.

Figure 6:
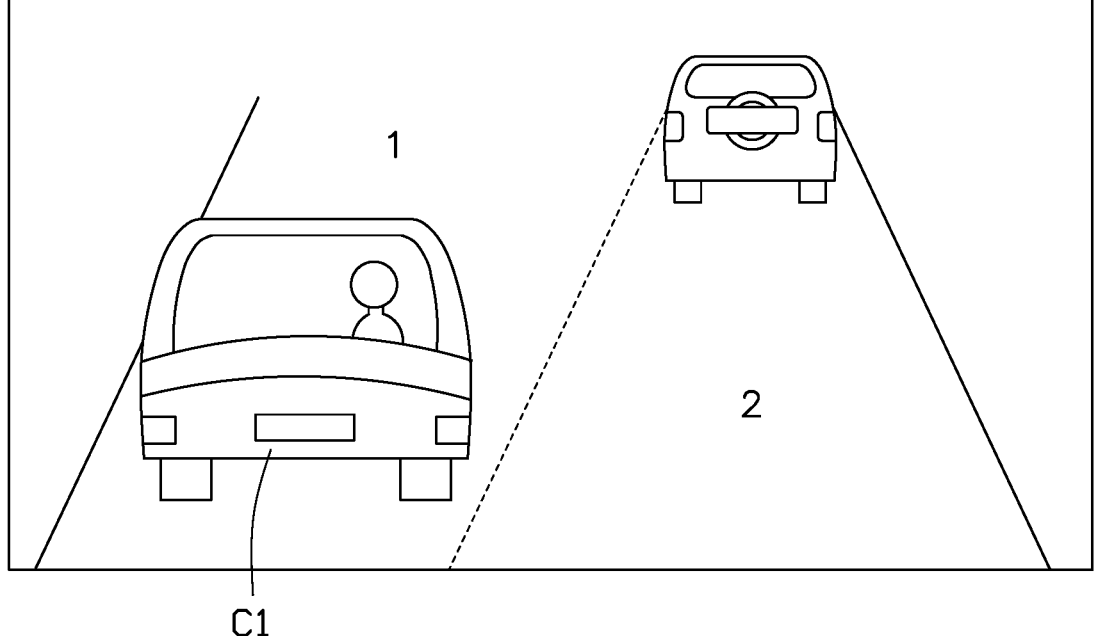
FIG. 6 is a schematic view of an embodiment of a vehicle at a road captured by the instant vehicle at a third traffic scenario.

Referring to FIG. 6, in a third scenario, the vehicle C1 is moving, and the vehicle C1 and the instant vehicle are at the different lanes. The vehicle C1 is at a first lane, for example the lane 1. The instant vehicle is at a second lane, for example the lane 2. If the movement direction of the vehicle C1 does not intersect with the movement direction of the instant vehicle, the method determines that the instant vehicle is at a safety state, and not provide the collision warning.

In some embodiments, the movement direction of the vehicle C1 does not intersect with the movement direction of the instant vehicle can include that, the movement direction of the vehicle C1 is opposite to the movement direction of the instant vehicle. For example, at the traffic lights facing the junctions, the vehicle C1 and the instant vehicle can be at two lanes in an opposite direction. The vehicle C1 turns right from the first lane to a right lane of the first lane. Simultaneously the instant vehicle turns right from the second lane to a right lane of the second lane. Thus, the movement direction of the vehicle C1 is opposite to the movement direction of the instant vehicle, namely, the movement direction of the vehicle C1 does not intersect with the movement direction of the instant vehicle. The method determines that the instant vehicle is at the safety state, and not provide the collision warning.

It can be understood that, in the third scenario, the lane information can further include whether the vehicle C1 and the instant vehicle are at two lanes in the same direction. And, the movement direction of the vehicle C1 does not intersect with the movement direction of the instant vehicle which can be, for example, at the traffic lights facing the junctions, the vehicle C1 and the instant vehicle can be at two lanes in an opposite direction. The vehicle C1 turns right from the first lane to a right lane of the first lane. Simultaneously the instant vehicle goes straight along the second lane. Thus, the movement direction of the vehicle C1 does not intersect with the movement direction of the instant vehicle. The method determines that the instant vehicle is at the safety state, and not provide the collision warning. It can be understood that, in the third scenario, it is not limited to that the vehicle C1 turns right and the instant vehicle goes straight as described in the preceding example, and the disclosure can be that the vehicle C1 goes straight and the instant vehicle turns right, the disclosure is not limited herein.

It can be understood that, in the third scenario, the vehicle C1 and the instant vehicle are not limited to be at two lanes in the opposite direction as shown in the FIG. 6, the vehicle C1 and the instant vehicle can be at two lanes in the same direction.

It can be understood that, in some embodiments, before the step S2-S3, the method can process each video frame, for example converting each video frame to a gray image and/or performing a filtering processing on each video frame.

The method can combine a detection of the one or more vehicles and a detection of the lane line, to determine the lane information, and to determine the movement state of the vehicle via the optical flow, and the lane information and the movement state of the one or more vehicle can be combined to determine whether the collision risk is existed. Thereof, a collision warning can be achieved.

Figure 7:
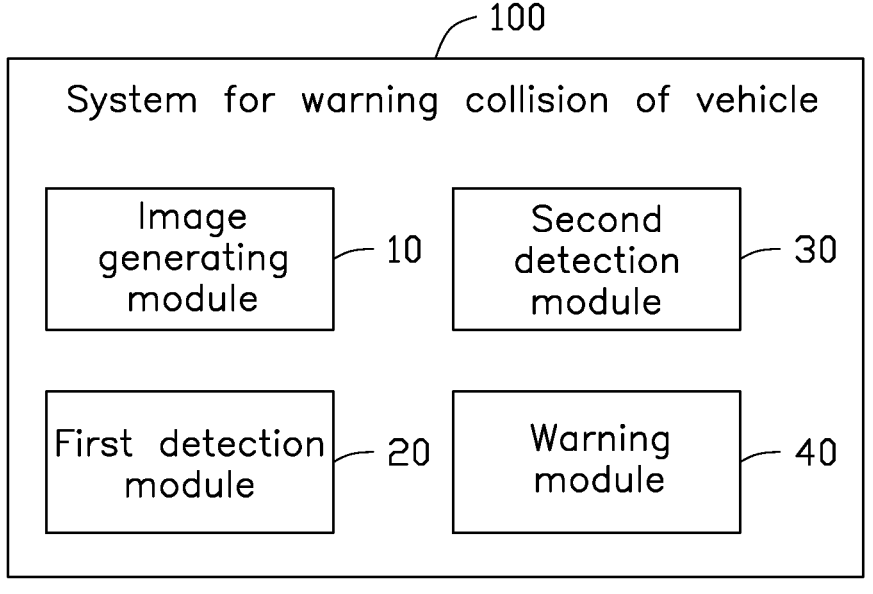
FIG. 7 is a block diagram of an embodiment of a system for warning collision of vehicle.

Referring to FIG. 7, a system for warning collision of vehicle is shown. The system 100 includes an image generating module 10, a first detection module 20, a second detection module 30, and a warning module 40.

The image generating module 10 is configured to generate a pre-detected video. The pre-detected video includes a number of video frames. The video frames are continuous. It can be understood that, in some embodiments, the image generating module can obtain a video of a road on a forward motion direction of the instant vehicle.

The first detection module 20 is configured to detect one or more vehicles in each video frame and determine a movement state of each vehicle via an optical flow method.

The second detection module 30 is configured to detect one or more lane lines in each video frame to obtain lane information.

The warning module 40 is configured to provide a collision warning according to the lane information and the movement state of the vehicle.

In some embodiments, the warning module 40 is further configured to provide a prompt via a loudspeaker.

It can be understood that, the image generating module 10, the first detection module 20, the second detection module 30, and the warning module 40 can cooperate to execute the preceding step S1-S4 of the method for warning collision of vehicle, a detail of the modules can be referred to the preceding step S1-S4, which are not described herein.

Figure 8:
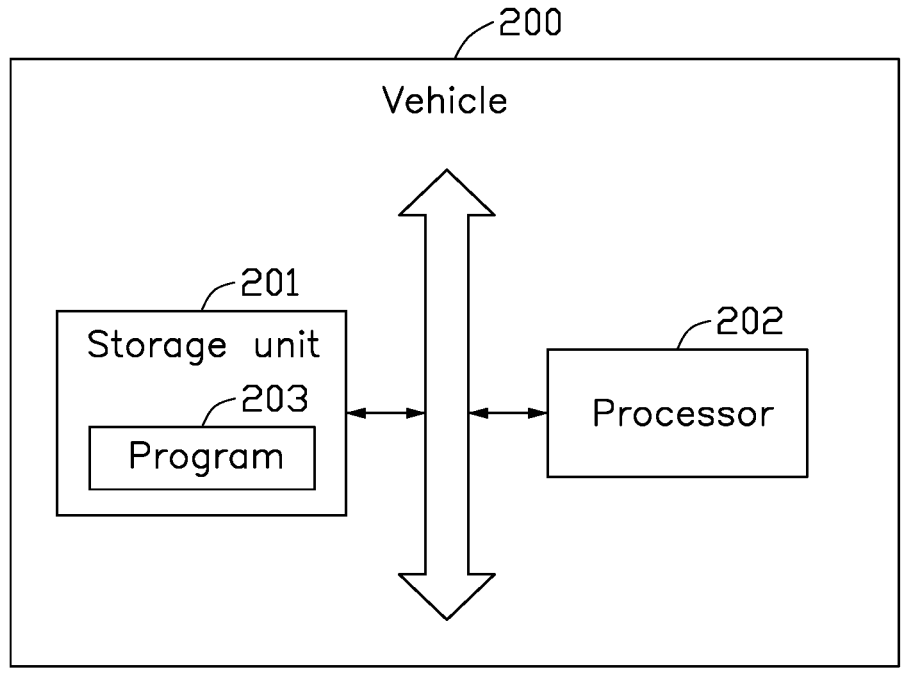
FIG. 8 is a block diagram of an embodiment of a vehicle.

FIG. 8 illustrates a block diagram of an embodiment of a vehicle. The vehicle 200 can include a storage unit 201, at least one processor 202, and one or more programs 203 stored in the storage unit 201 and can be run on the at least one processor 202.

It can be understood that, the vehicle shown in FIG. 8 constitutes no limitation on the vehicle, and may include more or fewer components than those shown in the figure, or some components may be combined, or a different component deployment may be used.

The at least one processor 202 can execute the one or more programs 203 to accomplish the steps of the exemplary method, for example the steps S1-S4 in the exemplary method. Or the at least one processor 202 can execute the one or more programs 203 to accomplish the functions of the exemplary system, for example the image generating module, the first detection module, the second detection module, and the warning module of the exemplary system.

The one or more programs 203 can be divided into one or more modules/units. The one or more modules/units can be stored in the storage unit 201 and executed by the at least one processor 202 to accomplish the disclosed purpose. The one or more modules/units can be a series of program command segments which can perform specific functions, and the command segment is configured to describe the execution process of the one or more programs 203 in the vehicle 200.

For example, the one or more programs 203 can be divided into the image generating module, the first detection module, the second detection module, and the warning module as shown in the FIG. 7, the functions of each module are as described above.

The at least one processor 202 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 202 can be a microprocessor or the at least one processor 202 can be any regular processor or the like. The at least one processor 202 can be a control center of the vehicle 200, using a variety of interfaces and lines to connect various parts of the entire vehicle 200.

The storage unit 201 stores the one or more programs 203 and/or modules/units. The at least one processor 202 can run or execute the one or more programs and/or modules/units stored in the storage unit 201, call out the data stored in the storage unit 201 and accomplish the various functions of the vehicle 200. The storage unit 201 may include a program area and a data area. The program area can store an operating system, and applications that are required for the at least one function, such as sound or image playback features, and so on. The data area can store data created according to the use of the vehicle 200, such as audio data, and so on. In addition, the storage unit 201 can include a non-transitory storage medium, such as hard disk, memory, plug-in hard disk, smart media card, secure digital, flash card, at least one disk storage device, flash memory, or another non-transitory storage medium.

If the integrated module/unit of the vehicle 200 is implemented in the form of or by means of a software functional unit and is an independent product sold or used, all parts of the integrated module/unit of the vehicle may be stored in a computer-readable storage medium. The vehicle can use one or more programs to control the related hardware to accomplish all parts of the methods of this disclosure. The one or more programs can be stored in a computer-readable storage medium. The one or more programs can be accomplish the block of the exemplary method when executing by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, read-only memory, Random access memory, electrical carrier signals, telecommunications signals, and software distribution package. The content stored in the computer-readable storage medium can be increased or decreased in accordance with legislative requirements and regulations of patent practice jurisdictions, for example, in some jurisdictions, legislation and patent practice stipulates that computer-readable storage medium does not include electrical carrier signals or telecommunications signals.

In the present disclosure, it should be understood that the disclosed methods and system can be employed or achieved in other ways. The system exemplified is only illustrative. For example, the division of the unit is only one division of logical function, and the actual implementation may have an additional division manner.

In addition, various functional units in the various embodiments of the disclosure may be integrated in one processing unit, each unit may be physically separated, or two or more units may be integrated in one unit. The above-mentioned integrated unit can be realized in the form of hardware or software functional unit.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other modules or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method for warning collision of vehicle comprising:

obtaining a pre-detected video; the pre-detected video comprising a plurality of video frames, and the video frames being continuous;

detecting one or more vehicles in each of the video frames and determining a movement state of each of the vehicles via an optical flow method;

detecting one or more lane lines in each of the video frames to determine lane information; and determining whether to provide a collision warning according to the lane information and the movement state of each of the vehicles;

wherein the determining a movement state of each of the vehicles via an optical flow method comprises:

segmenting each of the video frames into a foreground image and a background image; the foreground image comprising a pixel region of the one or more vehicles in a corresponding video frame, and the background region comprising a pixel region excluding the pixel region of the one or more vehicles in the corresponding video frame;

obtaining a plurality of first corners of the one or more vehicles in the foreground image and employing an optical flow method to determine a first optical flow velocity of the first corners of each of the vehicles in the foreground image;

obtaining a plurality of second corners in the background image and employing an optical flow method to determine a second optical flow velocity of the second corners in the background image;

determining a movement state of each of the vehicles according to the first optical flow velocity of the first corners of each of the vehicles in the foreground image and the second optical flow velocity of the second corners in the background image.

2. The method according to claim 1, wherein:

the lane information comprises whether the vehicle and the instant vehicle are at the same lane, and the movement state of the vehicle comprises a movement direction of the vehicle;

before the determining whether to provide the collision warning according to the lane information and the movement state of each of the vehicles, the method comprises:

obtaining a movement direction of the instant vehicle;

the determining whether to provide the collision warning according to the lane information and the movement state of each of the vehicles comprises:

providing the collision warning if the vehicle is moving, the vehicle and the instant vehicle are at the same lane, and the movement direction of the vehicle is opposite to the movement direction of the instant vehicle.

3. The method according to claim 1, wherein:

the lane information comprises a first lane that an instant vehicle is at and a second lane that the vehicle is at, and the movement state of the vehicle comprises a movement direction of the vehicle;

before the determining whether to provide the collision warning according to the lane information and the movement state of each of the vehicles, the method comprises:

obtaining a movement direction of the instant vehicle;

the determining whether to provide the collision warning according to the lane information and the movement state of each of the vehicles comprises:

providing the collision warning if the vehicle is moving, the vehicle and the instant vehicle are at different lanes, the movement direction of the instant vehicle is going straight along the second lane, and the movement direction of the vehicle intersects with the second lane.

4. The method according to claim 1, wherein:

the lane information comprises a first lane that an instant vehicle is at and a second lane that the vehicle is at, and the movement state of the vehicle comprises a movement direction of the vehicle;

before the determining whether to provide the collision warning according to the lane information and the movement state of each of the vehicles, the method comprises:

obtaining a movement direction of the instant vehicle;

the determining whether to provide the collision warning according to the lane information and the movement state of each of the vehicles comprises:

not provide the collision warning if the vehicle is moving, the vehicle and the instant vehicle are at different lanes, and the movement direction of the vehicle does not intersect with the movement direction of the instant vehicle.

5. The method according to claim 1, wherein:

the lane information comprises a first lane that an instant vehicle is at, a second lane that the vehicle is at, and whether the vehicle and the instant vehicle are at two lanes in the same direction; and the movement state of the vehicle comprises a movement direction of the vehicle;

before the determining whether to provide the collision warning according to the lane information and the movement state of each of the vehicles, the method comprises:

obtaining a movement direction of the instant vehicle;

the determining whether to provide the collision warning according to the lane information and the movement state of each of the vehicles comprises:

not providing the collision warning if the vehicle is moving, the vehicle and the instant vehicle are at two lanes in an opposite direction, the movement direction of the instant vehicle is turning right from the first lane to a right lane of the first lane, and the movement direction of the vehicle is turning right from the second lane to a right lane of the second lane.

6. The method according to claim 1, wherein the determining a movement state of each of the vehicles according to the first optical flow velocity of the first corners of each of the vehicles in the foreground image and the second optical flow velocity of the second corners in the background image comprises:

determining that the vehicle is still if a different value between the first optical flow velocity of the first corners of each of the vehicles in the foreground image and the second optical flow velocity of the second corners in the background image is within a preset range;

determining that the vehicle is moving and determining a movement direction of the vehicle if the different value between the first optical flow velocity of the first corners of each of the vehicles in the foreground image and the second optical flow velocity of the second corners in the background image is outside the preset range.

7. A vehicle comprising:

a storage device;

at least one processor; and the storage device storing one or more programs, which when executed by the at least one processor, cause the at least one processor to:

obtain a pre-detected video; the pre-detected video comprising a plurality of video frames, and the video frames being continuous;

detect one or more vehicles in each of the video frames and determining a movement state of each of the vehicles via an optical flow method;

detect one or more lane lines in each of the video frames to determine lane information; and determine whether to provide a collision warning according to the lane information and the movement state of each of the vehicles;

wherein further causes the at least one processor to:

segment each of the video frames into a foreground image and a background image; the foreground image comprising a pixel region of the one or more vehicles in a corresponding video frame, and the background region comprising a pixel region excluding the pixel region of the one or more vehicles in the corresponding video frame;

obtain a plurality of first corners of the one or more vehicles in the foreground image and employ an optical flow method to determine a first optical flow velocity of the first corners of each of the vehicles in the foreground image;

obtain a plurality of second corners in the background image and employ an optical flow method to determine a second optical flow velocity of the second corners in the background image;

determine a movement state of each of the vehicles according to the first optical flow velocity of the first corners of each of the vehicles in the foreground image and the second optical flow velocity of the second corners in the background image.

8. The vehicle according to claim 7, wherein:

the lane information comprises whether the vehicle and the instant vehicle are at the same lane, and the movement state of the vehicle comprises a movement direction of the vehicle;

the vehicle further causes the at least one processor to:

obtain a movement direction of the instant vehicle;

provide the collision warning if the vehicle is moving, the vehicle and the instant vehicle are at the same lane, and the movement direction of the vehicle is opposite to the movement direction of the instant vehicle.

9. The vehicle according to claim 7, wherein:

the lane information comprises a first lane that an instant vehicle is at and a second lane that the vehicle is at, and the movement state of the vehicle comprises a movement direction of the vehicle;

the vehicle further causes the at least one processor to:

obtain a movement direction of the instant vehicle;

provide the collision warning if the vehicle is moving, the vehicle and the instant vehicle are at different lanes, the movement direction of the instant vehicle is going straight along the second lane, and the movement direction of the vehicle intersects with the second lane.

10. The vehicle according to claim 7, wherein:

the lane information comprises a first lane that an instant vehicle is at and a second lane that the vehicle is at, and the movement state of the vehicle comprises a movement direction of the vehicle;

the vehicle further causes the at least one processor to:

obtain a movement direction of the instant vehicle;

not provide the collision warning if the vehicle is moving, the vehicle and the instant vehicle are at different lanes, and the movement direction of the vehicle does not intersect with the movement direction of the instant vehicle.

11. The vehicle according to claim 7, wherein:

the lane information comprises a first lane that an instant vehicle is at, a second lane that the vehicle is at, and whether the vehicle and the instant vehicle are at two lanes in the same direction; and the movement state of the vehicle comprises a movement direction of the vehicle;

the vehicle further causes the at least one processor to:

obtain a movement direction of the instant vehicle;

not provide the collision warning if the vehicle is moving, the vehicle and the instant vehicle are at two lanes in an opposite direction, the movement direction of the instant vehicle is turning right from the first lane to a right lane of the first lane, and the movement direction of the vehicle is turning right from the second lane to a right lane of the second lane.

12. The vehicle according to claim 7, wherein further causes the at least one processor to:

determine that the vehicle is still if a different value between the first optical flow velocity of the first corners of each of the vehicles in the foreground image and the second optical flow velocity of the second corners in the background image is within a preset range;

determine that the vehicle is moving and determine a movement direction of the vehicle if the different value between the first optical flow velocity of the first corners of each of the vehicles in the foreground image and the second optical flow velocity of the second corners in the background image is outside the preset range.

13. A non-transitory storage medium storing a set of commands, when the commands being executed by at least one processor of a vehicle, causing the at least one processor to:

obtain a pre-detected video; the pre-detected video comprising a plurality of video frames, and the video frames being continuous;

detect one or more vehicles in each of the video frames and determining a movement state of each of the vehicles via an optical flow method;

detect one or more lane lines in each of the video frames to determine lane information; and determine whether to provide a collision warning according to the lane information and the movement state of each of the vehicles;

wherein further causes the at least one processor to:

segment each of the video frames into a foreground image and a background image; the foreground image comprising a pixel region of the one or more vehicles in a corresponding video frame, and the background region comprising a pixel region excluding the pixel region of the one or more vehicles in the corresponding video frame;

obtain a plurality of first corners of the one or more vehicles in the foreground image and employ an optical flow method to determine a first optical flow velocity of the first corners of each of the vehicles in the foreground image;

obtain a plurality of second corners in the background image and employ an optical flow method to determine a second optical flow velocity of the second corners in the background image;

determine a movement state of each of the vehicles according to the first optical flow velocity of the first corners of each of the vehicles in the foreground image and the second optical flow velocity of the second corners in the background image.

14. The non-transitory storage medium according to claim 13, wherein:

the lane information comprises whether the vehicle and the instant vehicle are at the same lane, and the movement state of the vehicle comprises a movement direction of the vehicle;

the non-transitory storage medium further causes the at least one processor to:

obtain a movement direction of the instant vehicle;

provide the collision warning if the vehicle is moving, the vehicle and the instant vehicle are at the same lane, and the movement direction of the vehicle is opposite to the movement direction of the instant vehicle.

15. The non-transitory storage medium according to claim 13, wherein:

the lane information comprises a first lane that an instant vehicle is at and a second lane that the vehicle is at, and the movement state of the vehicle comprises a movement direction of the vehicle;

the non-transitory storage medium further causes the at least one processor to:

obtain a movement direction of the instant vehicle;

provide the collision warning if the vehicle is moving, the vehicle and the instant vehicle are at different lanes, the movement direction of the instant vehicle is going straight along the second lane, and the movement direction of the vehicle intersects with the second lane.

16. The non-transitory storage medium according to claim 13, wherein:

the lane information comprises a first lane that an instant vehicle is at and a second lane that the vehicle is at, and the movement state of the vehicle comprises a movement direction of the vehicle;

the non-transitory storage medium further causes the at least one processor to:

obtain a movement direction of the instant vehicle;

not provide the collision warning if the vehicle is moving, the vehicle and the instant vehicle are at different lanes, and the movement direction of the vehicle does not intersect with the movement direction of the instant vehicle.

17. The non-transitory storage medium according to claim 13, wherein:

the lane information comprises a first lane that an instant vehicle is at, a second lane that the vehicle is at, and whether the vehicle and the instant vehicle are at two lanes in the same direction; and the movement state of the vehicle comprises a movement direction of the vehicle;

the non-transitory storage medium further causes the at least one processor to:

obtain a movement direction of the instant vehicle;

not provide the collision warning if the vehicle is moving, the vehicle and the instant vehicle are at two lanes in an opposite direction, the movement direction of the instant vehicle is turning right from the first lane to a right lane of the first lane, and the movement direction of the vehicle is turning right from the second lane to a right lane of the second lane.

* * * * *